(12) United States Patent
Magnien et al.

(10) Patent No.: US 7,219,967 B2
(45) Date of Patent: May 22, 2007

(54) BRAKE SYSTEM FOR A VEHICLE DRIVEN BY AT LEAST ONE HYDRAULIC MOTOR FED IN A CLOSED CIRCUIT

(75) Inventors: Cédric Magnien, Vauciennes (FR); Mikaël Litot, Darmstadt (DE); Christian Schubert, Darmstadt (DE)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 10/741,414

(22) Filed: Dec. 19, 2003

(65) Prior Publication Data

US 2004/0178673 A1     Sep. 16, 2004

(30) Foreign Application Priority Data

Dec. 20, 2002   (FR) ................... 02 16294

(51) Int. Cl.
 *F16D 31/02*     (2006.01)
(52) U.S. Cl. .................. 303/152; 303/3; 303/10; 60/436
(58) Field of Classification Search ............... 303/9.69, 303/9.71, 10, 11, 116.1, 116.2, 152, 3; 180/65.1–65.6, 180/305–307; 60/436–489; 477/52
See application file for complete search history.

(56) References Cited

U.S. PATENT DOCUMENTS

| | | | | |
|---|---|---|---|---|
| 4,543,786 A | * | 10/1985 | Shuler | 60/435 |
| 5,220,790 A | * | 6/1993 | Allart et al. | 60/435 |
| 5,441,335 A | * | 8/1995 | Stumpe et al. | 303/3 |
| 5,467,598 A | * | 11/1995 | Welscher | 60/436 |
| 5,641,209 A | * | 6/1997 | Kushi et al. | 303/9.71 |
| 5,788,342 A | * | 8/1998 | Noguchi | 303/116.2 |
| 6,027,179 A | * | 2/2000 | Arai | 303/11 |
| 6,038,859 A | * | 3/2000 | Mangano et al. | 60/436 |
| 6,050,091 A | * | 4/2000 | Maruta | 60/436 |
| 6,170,587 B1 | * | 1/2001 | Bullock | 180/69.6 |
| 6,231,134 B1 | * | 5/2001 | Fukasawa et al. | 303/152 |
| 6,318,817 B1 | * | 11/2001 | Martin et al. | 303/116.1 |
| 6,406,105 B1 | * | 6/2002 | Shimada et al. | 303/152 |
| 6,484,497 B1 | * | 11/2002 | Jolliff et al. | 60/436 |
| 6,564,549 B2 | * | 5/2003 | Nagura et al. | 60/436 |
| 2001/0049318 A1 | | 12/2001 | Naguara et al. | |

* cited by examiner

*Primary Examiner*—Christopher P. Schwartz
(74) *Attorney, Agent, or Firm*—Ladas & Parry LLP

(57) ABSTRACT

A method of operating a brake system for a hydraulic motor, by feeding the hydraulic motor with at least one pump having a variable cubic capacity, in a closed circuit, providing a friction brake to brake the motor, providing a brake controller that controls an amount of applied frictional braking by the friction brake and an amount of applied hydraulic braking, and determining a level of actuation of the brake controller to detect normal and emergency braking situations. In normal braking situations, the proportional amount of frictional and hydraulic braking is managed as a function of parameters to cause progressive hydrostatic braking to occur by causing a ratio between the fluid flow rate delivered by the pump and the active cubic capacity of the motor to decrease progressively. In emergency braking situations there is a controlled sudden decrease in the ratio between the fluid flow rate delivered by the pump and the active cubic capacity of the motor, and then progressive hydrostatic braking occurs. The friction brake is activated during both normal and emergency braking situations.

16 Claims, 4 Drawing Sheets

BRAKE SYSTEM FOR A VEHICLE DRIVEN BY AT LEAST ONE HYDRAULIC MOTOR FED IN A CLOSED CIRCUIT

The present invention relates to a brake system for a vehicle driven by at least one hydraulic motor fed in a closed circuit by at least one pump having a variable cubic capacity, the system comprising friction brake means for braking the motor, brake control means for causing braking to take place, means for determining a level of actuation of said control means and for detecting an emergency braking situation or a normal braking situation as a function of the level of actuation of the brake control means, and braking management means which, in a normal braking situation, are suitable for causing progressive hydrostatic braking to take place, and, in an emergency braking situation, are suitable for causing sudden hydrostatic braking to take place.

BACKGROUND OF THE INVENTION

A system of that type is known from US 2001/049318.

In a normal braking situation, that known system performs progressive hydrostatic braking by gradually reducing the cubic capacity of the pump. When an emergency braking situation is detected, the cubic capacity of the pump is reduced much more rapidly, and, when said cubic capacity reaches zero, the friction brake means are actuated.

The brake system of the invention applies in particular to a working vehicle, e.g. to site plant or to a farm vehicle. In the working situation, the vehicle travels at a relatively slow working speed, generally not substantially exceeding ten kilometers per hour. For traveling between work sites, the vehicle can reach a higher speed of travel on roads.

The progressive hydrostatic braking must be effective, without however generating unacceptable discomfort for the driver of the vehicle. The braking system of a vehicle of that type must offer good performance both under working conditions, and while traveling on roads.

In addition, it is also desirable to limit the travel time of vehicles of the above-mentioned type when traveling between work sites, which makes it necessary to increase the maximum speed of on-road travel of such vehicles. Vehicles are thus designed whose maximum on-road speed can reach 40 kilometers per hour or even faster.

The brake system disclosed by US 2001/049318 makes it possible to perform emergency braking when circumstances so require. However, its normal braking, which is hydrostatic only, might not always be effective when the vehicle is in certain travel situations, in particular on the road, and when it is traveling at relatively high speeds. For example, when the engine is turning fast due to insufficient restraining torque, such normal braking might not be sufficient. Thus, it is often necessary to use emergency braking, which is uncomfortable.

The friction brake means are used for emergency braking only, after emergency hydrostatic braking has taken place. That precaution is supposed to avoid having to provide a large-size brake. Nevertheless, it is at the start of emergency braking that it is necessary to reduce the speed of the vehicle rapidly, and sudden hydrostatic braking alone is not fully satisfactory in achieving such a rapid reduction in speed. In addition, in that system, the speed of the vehicle is not taken into account for adjusting the hydrostatic braking appropriately, regardless of whether braking is normal braking or emergency braking. Therefore, that system does not make it possible to guarantee that the vehicle always stops within a distance compatible with safety requirements, without generating jolts that are incompatible with providing comfort for the driver of the vehicle.

OBJECTS AND SUMMARY OF THE INVENTION

An object of the present invention is to provide an improved brake system making it possible to perform normal braking and emergency braking.

This object is achieved by the fact that the brake control means are suitable for engaging both the friction braking and the hydrostatic braking, these two types of braking being combined, and by the fact that, in a normal braking situation, the braking management means are suitable for causing progressive hydrostatic braking to take place by causing the ratio between the fluid flow rate delivered by the pump and the active cubic capacity of the motor to decrease progressively, in compliance with an order determined as a function of the level of actuation of the brake control means, of a parameter representative of the speed of the vehicle, of the active cubic capacity of the pump, and of the active cubic capacity of the motor, whereas, in an emergency braking situation, said management means are suitable for successively causing a sudden decrease to take place in the ratio between the fluid flow rate delivered by the pump and the active cubic capacity of the motor, and then causing progressive hydrostatic braking to take place.

Thus, with the invention, friction braking is activated with hydrostatic braking, both during normal braking and during emergency braking.

The hydrostatic braking order makes it possible to determine the progressive decrease in the ratio between the fluid flow rate delivered by the pump and the active cubic capacity of the motor. Said order is a function of the above-mentioned parameters. For example, the brake control means comprise a pedal which is depressed by the driver to actuate the brake means. The depression stroke of the pedal may be taken as an indicator of the level of actuation of the control means. It is also possible to choose other indicators. For example, the friction brake means may be caused to co-operate with one another by feeding brake fluid from a actuator. The level of actuation of the control means may be represented by the brake fluid pressure in the brake circuit, and in particular in such an actuator.

The parameter representing the speed of the vehicle may be the vehicle speed itself, as detected by suitable means, or else any other parameter serving to calculate said speed, e.g. the speed(s) of the hydraulic motor(s) for driving the vehicle. If the active cubic capacity of the pump and the active cubic capacity of the hydraulic motor are known, and if the diameter(s) of the wheels of the vehicle is/are known, then the speed of the vehicle can be calculated as a function of this data and of the speed of an engine that serves to drive the pump. In which case, the parameter representative of the speed of the vehicle may be the speed of the engine driving the pump, while taking account of the above-mentioned data.

For normal braking, the mechanical braking, due to the friction braking means being activated, is assisted by hydrostatic braking which, by causing a progressive decrease to take place in the ratio between the fluid flow rate delivered by the pump and the active cubic capacity of the motor, makes hydrostatic braking more effective, and thus makes combined braking more effective. For any given active operating cubic capacity of the motor, a decrease in the fluid flow rate delivered by the pump makes it possible to reduce the speed of rotation of the rotor of the motor.

Similarly, for any given value of the fluid flow rate delivered by the pump, an increase in the cubic capacity of the motor makes it possible to decrease its speed. In addition, an increase in the cubic capacity of the motor increases its torque and improves the effectiveness of braking.

During normal braking, provision is made for the hydrostatic braking to be progressive, i.e. for it to be effective without however generating unacceptable discomfort for the driver of the vehicle. Although the fluid flow rate delivered by the pump can be decreased very steadily, e.g. by modifying the inclination of the cam plate of a conventional pump, the same does not always apply to increasing the active cubic capacity of the motor. For example, for radial-piston motors, the active cubic capacity generally varies in steps.

In outline, if the fluid flow rate delivered by the pump remains constant, an increase in the cubic capacity of the motor leading to said cubic capacity being doubled halves the speed of rotation of the rotor suddenly.

Thus, if braking is triggered while the motor is operating in its small active cubic capacity, then firstly the fluid flow rate delivered by the pump is decreased progressively to reach a flow rate deemed to be compatible with the motor going over to its large cubic capacity, and then the fluid flow rate delivered by the pump is increased rapidly (in particular by increasing the cubic capacity of the pump) so as to cause the motor to go over to its large cubic capacity, without that giving rise to too sudden a decrease in the speed of rotation of the motor. As from this situation, the fluid flow rate delivered by the pump is decreased steadily again.

Generally, it is considered that, even though the deceleration curve of the vehicle is not entirely smooth, braking is progressive if the maximum deceleration remains at about 5 meters per second per second ($m/s^2$). Provision is made for the fraction of the deceleration that is due to hydrostatic braking to remain compatible with such a deceleration slope.

When a normal braking situation is detected, the braking system generates progressive hydrostatic braking that is combined with the friction braking and that is suitably adjusted relative thereto. In contrast, when an emergency braking situation is detected, the hydrostatic braking, which is also combined with the friction braking, results firstly in sudden braking, the sudden decrease in the above-mentioned ratio generating a sudden decrease in the speed of rotation of the motor, then in progressive hydrostatic braking. In emergency braking, the driver of the vehicle feels a jolt, due to the sudden braking, but said jolt is quite bearable because it is related to the fact that the driver has triggered emergency braking.

The sudden decrease in the ratio between the fluid flow rate delivered by the pump and the active cubic capacity of the motor may be achieved by increasing the active cubic capacity of the motor, in particular when the motor has a continuously variable cubic capacity. For example, it is possible to choose to perform the hydrostatic braking by increasing the cubic capacity of the motor in a proportion of in the range 10% of the active cubic capacity of the motor to 20% of said active cubic capacity at the time of braking, subject to said increase remaining within the limit of the maximum cubic capacity of the motor.

In particular when the cubic capacity of the motor varies in steps, and depending on the ratio between the steps, it is not always possible to effect sudden hydrostatic braking by increasing the cubic capacity of the motor.

Therefore, it is advantageous, in an emergency braking situation, for the braking management means to be suitable for successively causing a sudden decrease to take place in the fluid flow rate delivered by the pump, and then causing progressive hydrostatic braking to take place.

Detection of an emergency braking situation or of a normal braking situation is related to the level of actuation of the brake actuator means. For example, so long as a representative parameter remains less than a determined value, the braking management means consider that the situation is a normal braking situation whereas, when said parameter reaches or exceeds said value, it is an emergency braking situation that is detected. The parameter may be the depression stroke of the brake pedal, or the pressure in the brake circuit. The value making it possible to detect an emergency braking situation may be a given value or a proportion of a maximum value of said parameter (e.g. 80% of the maximum stroke of the brake pedal or of the maximum pressure in the brake circuit).

Preferably, in an emergency braking situation, and as a function of a parameter representative of the speed of the vehicle, of the active cubic capacity of the pump, and of the active cubic capacity of the motor, the braking management means are suitable for causing a sudden decrease to take place in the ratio between the fluid flow rate delivered by the pump and the active cubic capacity of the motor, and for causing progressive hydraulic braking to take place.

This parameter, as a function of which emergency hydrostatic braking is caused to take place, is advantageously the same as the parameter as a function of which progressive hydrostatic braking is caused to take place in a normal braking situation.

Advantageously, the sudden decrease in the fluid flow rate delivered by the pump is achieved by means of a sudden decrease in the cubic capacity of the pump.

When the pump is an axial-piston pump having an angularly-positionable cam plate, the sudden decrease in the cubic capacity of the pump may be obtained by modifying the inclination of the cam plate to a suitable angle.

Advantageously, the pump is driven by an auxiliary engine, and the braking management means are suitable for causing the drive speed of said engine to be reduced at least at the beginning of a braking stage.

As indicated above, the hydrostatic braking consists in reducing the speed of rotation of the hydraulic motor and in increasing its torque by reducing the ratio between the fluid flow rate delivered by the pump and the active cubic capacity of the motor. Even in a normal braking situation, in which a progressive decrease in said ratio is desired, a reduction in the speed of the engine that drives the pump constitutes an advantageous means for decreasing said ratio. Naturally, these means may be combined with a reduction in the cubic capacity of the pump and/or with an increase in the cubic capacity of the hydraulic motor.

Depending on the time taken by the auxiliary engine to respond to an order to reduce its speed, it is possible to consider causing a reduction in the speed of said engine to take place, on its own or combined with a decrease in the cubic capacity of the pump and/or with an increase in the active cubic capacity of the hydraulic motor, in order to achieve sudden hydrostatic braking.

In an advantageous example, the value of the sudden decrease in the cubic capacity of the pump is a predetermined proportion of the active cubic capacity of the pump at the time of braking.

Depending on the type of vehicle, it is possible to calculate the proportion in which the active cubic capacity of the pump can be decreased in order to achieve the sudden decrease in the fluid flow rate that is necessary for the vehicle to be stopped appropriately in an emergency braking situation, without however giving rise to jolts that are excessive for the driver of the vehicle. For example, said proportion may be about 50% when, at the time of braking, the hydraulic motor is operating in its minimum active cubic capacity, and about 10% when, at the time of braking, the motor is operating in its maximum active cubic capacity. If the motor has one or more intermediate cubic capacities between its two extreme cubic capacities, the proportion of the decrease when the motor is in an intermediate cubic capacity may, for example, lie in the range 10% to 50%, given that, the larger the cubic capacity of the motor, the higher the available hydrostatic braking torque, and therefore the larger the impact of the decrease in the cubic capacity of the pump is on the braking.

In general, during progressive hydrostatic braking, provision is made to ensure rate of change over time of the ratio between the fluid flow rate delivered by the pump and the active cubic capacity of the hydraulic motor not to exceed a determined value, corresponding, for example, to vehicle deceleration of less than or equal to 5 m/s². During sudden hydrostatic braking performed in accordance with the invention for emergency braking, the sudden variation in said ratio may be defined by the fact that its rate of change momentarily becomes significantly greater than said determined value, e.g. by being not less than 5 times or 10 times said value, or even 20 or more times said value.

Given the response and actuation times of the means for controlling the mechanisms in question (about $1/10^{th}$ of a second), the above-mentioned decrease in the ratio is not instantaneous.

If the motor has a plurality of active operating cubic capacities, it is advantageous, when braking is caused to take place while the motor is in a small active cubic capacity, for the braking management means to be suitable for causing the motor to go over to a larger active cubic capacity when the value of the active cubic capacity of the pump is less than or equal to a limit value, then for increasing the value of said active cubic capacity of the pump to a value determined as a function of the motor going over to said larger active cubic capacity so as to prevent said motor from generating a sudden decrease in the speed of the motor, and for progressively decreasing the cubic capacity of the pump from said determined value.

As indicated above, it is advantageous for the motor to go over to its large active cubic capacity in order to achieve effective braking. However, going over to the large active cubic capacity without modifying the cubic capacity of the pump would reduce the drive speed of the motor suddenly and would cause jolts in the speed of the vehicle that would be unpleasant or even unacceptable. With the above-mentioned sequence, if braking is caused to take place while the cubic capacity of the pump is greater than the limit value, then said cubic capacity of the pump is initially decreased to bring it down to or below said limit value. When the value of the active cubic capacity of the pump so permits, the motor is caused to go over to its large active cubic capacity so as to increase momentarily the fluid flow rate feeding the motor as a function of the increase in the cubic capacity of said motor. It is thus possible to prevent the speed of the motor from decreasing too suddenly.

Advantageously, for progressive hydrostatic braking, in a normal braking situation, the braking management means are suitable for maintaining the cubic capacity of the pump at a given value corresponding to the motor being allowed to go over to its large active cubic capacity, for a stabilization lapse of time before the motor is caused to go over to its large active cubic capacity.

The stabilization lapse of time is generally approximately in the range $1/100^{th}$ of a second to 1 second. Maintaining said value unchanged softens deceleration of the vehicle for said lapse of time, compared with the deceleration that was previously due to the cubic capacity of the pump decreasing steadily down to said limit value. After the softening stage, the braking management means cause the cubic capacity of the pump to increase rapidly to a new value that is synchronous with the actual change of cubic capacity of the motor (movement of a cubic capacity change slide). The orders for changing the cubic capacities of the pump and of the motor are issued simultaneously or in very slightly offset manner so as to obtain such synchronization in spite of the optionally different actuation times of the means for changing the cubic capacities of the pump and of the motor. The new cubic capacities are such that the speed of the motor is substantially the same before and after the cubic capacity changes.

Advantageously, after the changes in cubic capacity, the braking management means maintain the cubic capacity of the pump at its new value for a brief period (e.g. for from $1/100$ to $20/100^{ths}$ of a second), before resuming the progressive decrease in said cubic capacity.

Advantageously, in an emergency braking situation, the braking management means are suitable for decreasing or substantially canceling the stabilization lapse of time before causing the cubic capacity of the motor to increase (the deceleration-softening step is omitted) and, optionally, for also canceling the maintaining of the cubic capacity of the pump at its new value.

For example, as soon as the cubic capacity of the pump reaches the above-mentioned limit value, the motor is caused to go over to its large cubic capacity, and the cubic capacity of the pump is caused to increase significantly without delay (or with a slight delay of about $1/10^{th}$ of a second for synchronizing the actual cubic capacity changes for the motor and for the pump, in spite of the difference between the response and actuation times of the control means for controlling the cubic capacity changes). Progressive decrease in the cubic capacity of the pump then resumes.

Advantageously, the brake control means comprise an actuatable control member and the friction brake means comprise at least two brake members constrained to rotate respectively with the rotor and with the stator of the motor, and an actuator whose moving portion co-operates with one of said members to urge it into friction contact with the other member as a function of the fluid pressure in the actuator, and the means for detecting a level of actuation of the control means are suitable for detecting the amplitude of actuation of said control member or the fluid pressure in the actuator.

BRIEF DESCRIPTION OF THE DRAWINGS

The invention will be well understood and its advantages will appear more clearly on reading the following detailed description of an embodiment shown by way of non-limiting example. The description is given with reference to the accompanying drawings, in which.

MORE DETAILED DESCRIPTION

Figure 1:
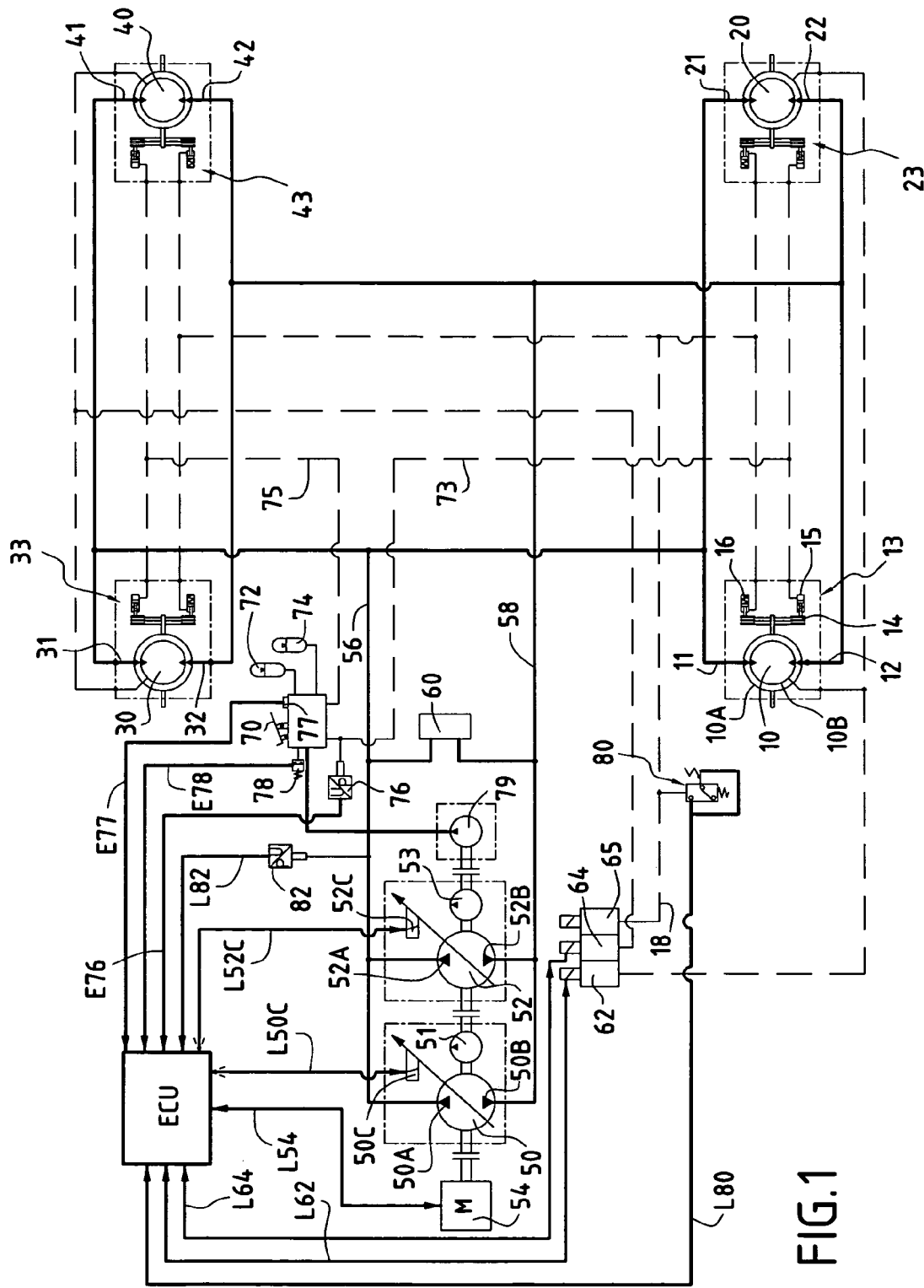
FIG. 1 shows a hydraulic circuit including a brake system of the invention.

The circuit of FIG. 1 includes two motors 10, 20 for driving the front axle of a vehicle and two other motors 30, 40 for driving the rear axle. The motors are fed by pumps. In this example, two main pumps 50 and 52 having continuously variable cubic capacities are driven by an engine 54 and are disposed in parallel. In a manner known per Se, each main pump is associated with a respective booster pump 51, 53, serving to avoid cavitation in the main ducts of the circuit. Naturally, a single variable cubic capacity pump and a single booster pump could suffice.

For reasons of simplification, only the connections between the main pumps and said main ducts are shown. Thus, the orifices 50A and 52A of the pumps 50 and 52 are connected to a first main duct 56 which is itself connected to a first main duct of each hydraulic motor, respectively 11, 21, 31, and 41. The orifices 50B and 52B of the pumps 50 and 52 are connected to a second main duct 58 to which the second main ducts of the motors are connected, namely ducts 12, 22, 32, and 42. In a manner known per Se, a heat exchanger unit 60 is disposed between the main ducts 56 and 58 in order to perform heat exchange with the fluid flowing around the circuit, which is a closed circuit.

In the example shown, each of the motors in the circuit has two active operating cubic capacities. It is thus possible to analyze the motor 10 as being made up of two half-motors, respectively 10A and 10B, both of the half-motors being active when the large cubic capacity of the motor is active, by them being coupled to the two main ducts 11 and 12, whereas only one of them, 10A or 10B is active when the small cubic capacity of the motor 10 is active, the other half-motor being short-circuited.

The circuit includes cubic capacity change means for changing the cubic capacities of the motors. For example, for each motor, said cubic capacity change means comprise a cubic capacity change slide integrated in the motor or fixed to the casing thereof, the slide being moved to connect the orifices of each half-motor to respective ones of the main ducts, or to short-circuit them by putting said orifices at the same pressure. In the example shown, the circuit also includes means for controlling said cubic capacity change means simultaneously for the motors of each axle. Thus, the circuit includes a first solenoid valve 62 which serves to change the cubic capacity of the motors 10 and 20 of the first axle, e.g. the front axle, and a second solenoid valve 64 which serves to change the cubic capacity of the motors 30 and 40 of the second axle, e.g. the rear axle. The valves 62 and 64, like the valve 65 described below, are fed hydraulically by the booster circuit (not shown).

Each motor is associated with friction brake means 13, 23, 33, and 43. For example, said brake means are constituted by a drum brake or by a multiple disk brake. It is a multiple disk brake that is shown, the disks 14 serving to brake the motor 10 comprising a first series of disks secured to the stator of the motor and a second series of disks secured to its rotor. In general, the friction brake means comprise at least two brake members constrained to rotate respectively with the rotor and with the stator of the motor. In addition, the brake means 13 further comprise an actuator whose moving portion co-operates with one of the brake members (with a disk from one of the above-mentioned series) to urge it into friction contact with the other member (to urge the disks of the various series into friction contact with one another) as a function of the fluid pressure in the actuator. In this example, for the brake means 13, an actuator 15 is shown that serves for service braking because it can be fed with fluid to cause the above-mentioned friction contact to occur, and an actuator 16 is shown that serves for brake release for releasing the parking or safety brake, because it can be fed with pressurized fluid to assist in moving the disks apart. In the absence of pressurized fluid in the actuator 16, the parking or safety brake is actuated by resilient return means. Naturally, this is merely one embodiment, making it simpler to show the brake system and its control means. The friction brake means for the motors 20 to 30 and 40 are identical to the friction brake means for the motor 10 that are described above.

The actuator 16 may be fed with fluid from an auxiliary pump (e.g. a booster pump), via a brake release duct 18 connected to a solenoid valve 65, itself connected to the auxiliary pump via a duct (not shown).

The brake system includes brake control means constituted in the example shown by a brake pedal 70. When said pedal is depressed, the brake actuators of the friction brake means 13, 23, 33 to 43 can be fed with fluid. The system includes a brake fluid circuit which, in this example, has two accumulators 72 and 74 that can be fed with brake fluid by an auxiliary pump 79. For example, the brake actuators of the brake means 13 and 23 of the front axle are fed with brake fluid coming from the accumulator 72, via a brake fluid feed duct 73, while the brake actuators of the brake means 33 and 43 of the rear axle are fed with brake fluid coming from the accumulator 74, via the brake fluid feed duct 75.

As indicated above, the level of actuation of the brake control means, constituted by the pedal in this example, can be indicated by the stroke of said pedal and/or by the brake fluid pressure in the brake ducts. Thus, the system shown in FIG. 1 includes a braking pressure sensor 76 which, in this example, measures the braking pressure in the brake fluid feed duct 73. It also includes an end-of-stroke sensor 77 which is activated when the pedal 70 is actuated in a manner such as to reach the end of its stroke. A pressure sensor 78 monitors the fluid pressure coming from the accumulators 72 and 74 and that is available for braking.

An electronic control unit (ECU) provided with a memory capacity and with suitable computing means manages the braking so that, while taking account of the braking performed by the friction braking means of the motors, it controls the hydrostatic braking. In order to determine the level of actuation of the brake pedal, the ECU is connected to the sensors 76 and 77 by respective inlet lines E76 and E77. It is also connected to the sensor 78 via a line E78 so as to emit an alarm if the pressure available for braking becomes insufficient.

The ECU can cause the active cubic capacities of the pumps 50 and 52 to vary. The circuit includes respective means 50C and 52C for causing the cubic capacities of the pumps 50 and 52 to vary, e.g., when the pumps are axial piston pumps, for causing the inclinations of the cam plates of the pumps to vary. The ECU is connected to said control means by lines, respectively L50C and L52C. As indicated by the arrows shown in uninterrupted manner on said lines, the ECU controls the control means 50C and 52C via said lines and thus knows which active cubic capacities the pumps are in because of the order that it issues. However, as indicated by the arrows shown in dashed manner on the lines L50C and L52C, it can also receive information about the situations of said control means 50C and 52C that enables it to verify the active cubic capacities of the pumps 50 and 52.

The ECU is also connected to the engine 54 via a line L54 which enables it to control the speed of revolution of its engine and, in return, to be informed of said speed. Via lines L62 and L64, the ECU is also connected to the control means 62 and 64 for changing the cubic capacities of the motors, so as to be able to cause cubic capacity changes to take place, and, in return, to be informed of the situations of said control means 62 and 64 in order to know which active cubic capacities the motors are in.

Since it knows the speed of the engine 54, the active cubic capacities of the pumps and of the motors, and the distance covered during one revolution of each of the wheels of the vehicle, the control unit ECU can determine the speed of advance of said vehicle.

The ECU can be a microprocessor including, in particular, a parameterizable memory zone and computing means enabling it, on the basis of the data that it receives via the various above-described lines, to generate an order for controlling the various members of the brake system that are involved in performing hydrostatic braking.

The ECU is also informed when the parking brake is in a brake release situation via a line L80 coming from a switch 80. In order to cause such brake release to take place, the operator actuates a valve 65 which makes it possible for the brake release duct 18 to be fed with brake release fluid. The pressure in said duct actuates the switch 80 which sends a signal to the ECU.

Figure 2:
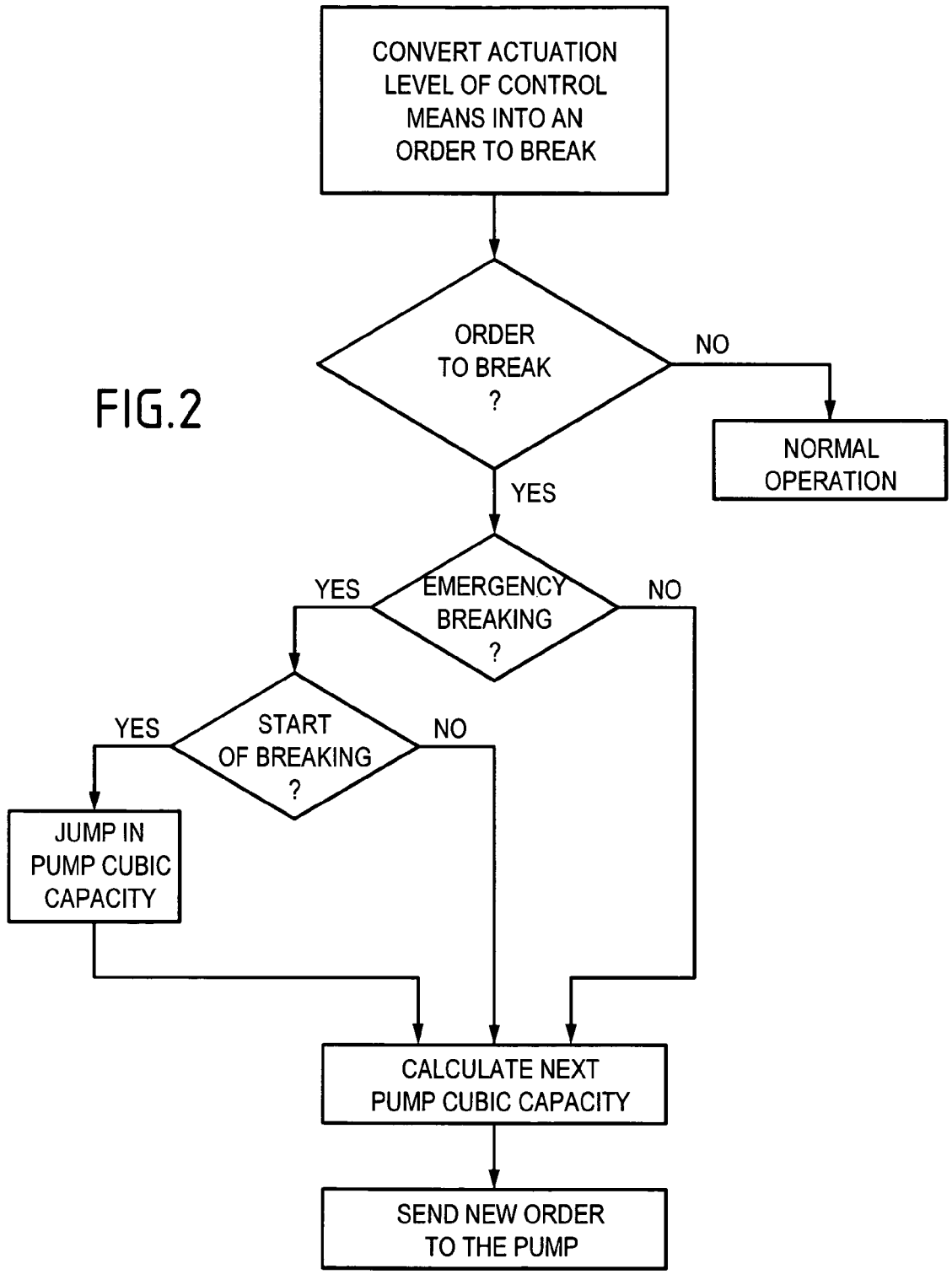
FIG. 2 is a flow chart showing how the brake system of the invention operates.
Figure 3:
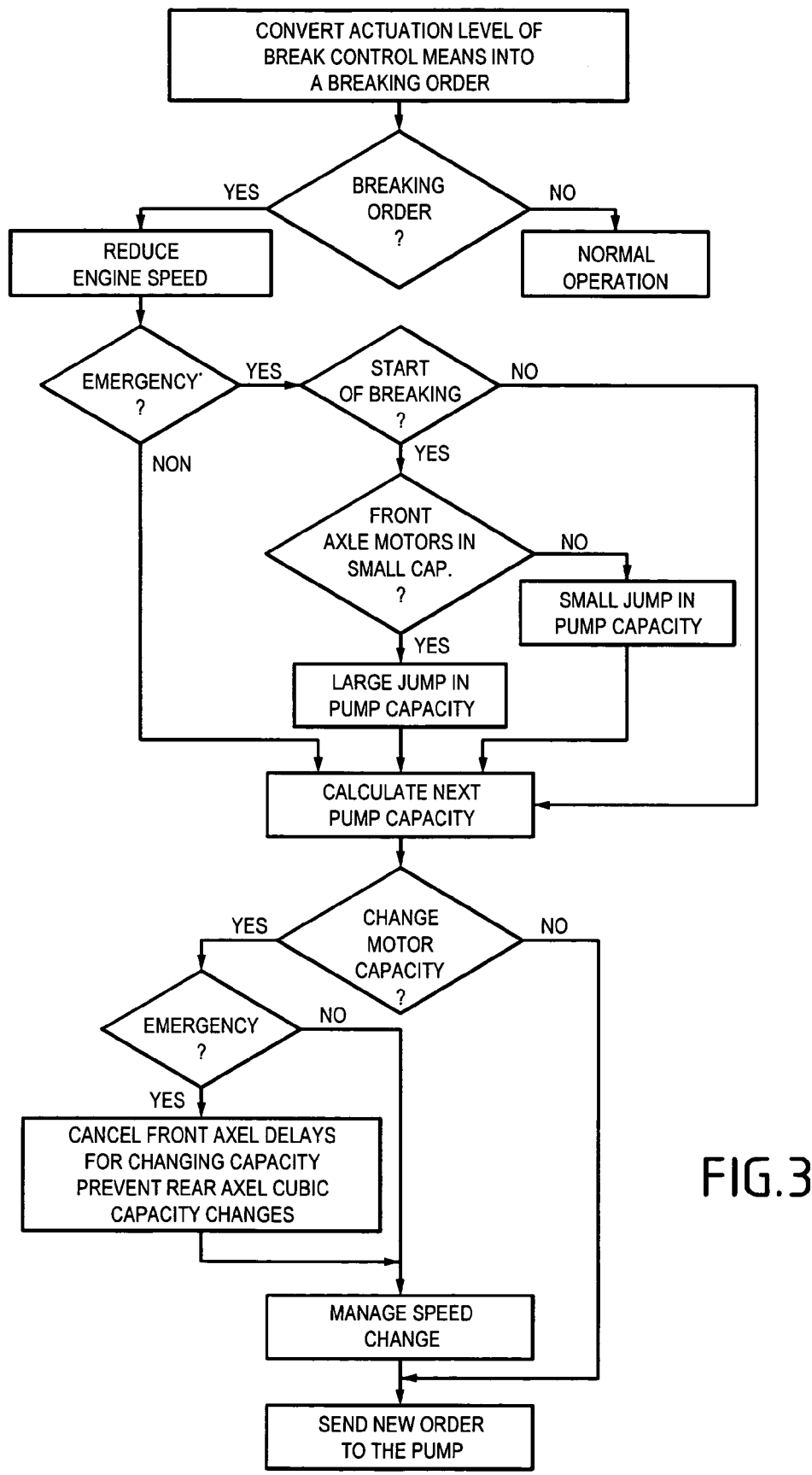
FIG. 3 is a flow chart showing an advantageous variant.

With reference to FIGS. 2 and 3, a more detailed description is given below of how the brake system operates.

At each loop, the ECU verifies the level of actuation of the brake pedal, it being informed of said level of actuation via the lines E76 and E77. If said level does not indicate a desire to brake the vehicle, the ECU issues no braking order, and the hydraulic motor operates normally.

Otherwise, the ECU issues a braking order, and the system enters the braking loop.

Hydrostatic braking is caused differently depending on whether the level of actuation detected reveals a normal braking situation or an emergency braking situation. As indicated above, the stroke of the brake pedal and/or the braking pressure can indicate said level of actuation.

Naturally, the threshold from which the emergency braking situation is detected depends on the type of vehicle, and in particular on its mass. The end-of-stroke sensor 77 constitutes a safety element in the event that the proportional sensor 76 fails, so as to trigger an emergency braking situation.

If the level of actuation of the control means requires a braking order to be established, the ECU checks whether the situation is an emergency braking situation. If so, it checks whether the time concerned by said order is the start-of-braking time.

If so, then, in accordance with the invention, the ECU causes the fluid flow rate delivered by the pump to decrease suddenly. In the example shown, such a sudden decrease is effected by a jump in the cubic capacity of the pump, which jump reduces said cubic capacity. As indicated above, the jump can constitute a predetermined proportion of the active cubic capacity of the pump at the time of braking. Said proportion is predetermined as a function of the vehicle that is equipped with the braking system, so that the resulting speed reduction jolt is sufficient for emergency braking while remaining acceptable.

The next pump cubic capacity is calculated as a function of said jump. As a function of the calculation, a new order is sent to the control means for controlling the cubic capacity of the pump. The cubic capacity of the pump can thus be modified at each time step. For example, the duration of a time step is about 50 milliseconds (ms). At the next time step, the system is still in an emergency braking situation but it is no longer at the start of braking. Therefore, the ECU calculates the next pump cubic capacity in a manner such as to comply with a deceleration that is deemed to be appropriate. For example, it is considered that the maximum deceleration should be about 5 m/s$^2$. After the jump in cubic capacity effected at the first time step, the hydrostatic braking is progressive for the following iterations.

When the situation is not an emergency braking situation, but rather a normal braking situation, the control unit calculates the new pump cubic capacity as from the first time step so as to comply with progressive deceleration, e.g. by remaining capped at no more than 5 m/s$^2$.

A description is given below of FIG. 3 which shows how the braking system operates in a variant.

When the level of actuation of the brake control means is such that a braking order is established, the ECU can, by entering the braking loop, cause the speed of the engine 54 to be reduced. The value of the reduction can be a proportion of the speed of the engine 54 at the time at which the braking order is issued. Said value makes it possible to limit the fluid flow rate delivered by the pump, without generating any violent jolt, given the time required for the engine to react to an order to reduce its speed.

The reduction can be caused again independently of whether the situation is an emergency braking situation or a normal braking situation. For example, the reduction in the speed of the engine that is to be applied can be determined on the basis of a correspondence table between the speed of the engine and the ratio between the cubic capacity of the pump and the active cubic capacity of the motor.

When the circuit includes a plurality of motors, then what is referred to in the present text as the "active cubic capacity of the motor" is actually the sum of the active cubic capacities of the motors in question (e.g. on an axle) that are connected to one of the delivery ducts of the pump.

The variant shown in FIG. 3 relates to a circuit of the type shown in FIG. 1, in which both of the axles of the vehicle are drive axles, their respective motors each having a plurality of operating cubic capacities. When the situation is an emergency braking situation and at the start of braking, i.e. when at the first time step in the emergency braking management effected by the ECU, said ECU firstly checks whether the motor(s) on the axle of the vehicle that is mainly affected by the braking is/are in small cubic capacity mode. In general, given the load transfer that takes place in the vehicle while it is being braked, said axle is the front axle.

If the motor(s) is/are in small cubic capacity mode, the ECU causes a large jump in pump cubic capacity to take place. Otherwise, it causes only a small jump in pump cubic capacity to take place.

The two expressions "large jump" and "small jump" are used to distinguish between the situations. When a motor is in small cubic capacity mode, the hydrostatic braking torque generated is smaller than when it is in large cubic capacity mode. Therefore, when the motor is in small cubic capacity mode, the same reduction in the cubic capacity of the pump feeding the motor results in a jolt in the advance of the vehicle driven by said motor that is much less violent than when the motor is in its large cubic capacity. For example, depending on the type of vehicle, the large jump in the cubic capacity of the pump, allowed when the motor is in its small cubic capacity, can be about 50% of the cubic capacity of the pump that is observed at the time of braking. The small jump in pump cubic capacity is generally smaller than the large jump in cubic capacity, and it can be zero or almost zero, or else limited to a proportion, e.g. about 10% of the active cubic capacity of the pump at the time of braking. As a function of the jump in pump cubic capacity that is to be applied, the ECU calculates the next pump cubic capacity, on the basis of which the new order is to be formulated, for causing the cubic capacity of the pump to change. Naturally, if the motors have one or more intermediate active cubic capacities between their minimum and their maximum cubic capacities, it is possible to devise an intermediate jump in pump cubic capacity for each of the intermediate cubic capacities.

Since it knows the current cubic capacity of the pump, the ECU checks whether it is possible or opportune to change the cubic capacity of the motor. Naturally, if all of the motors are in large cubic capacity mode, such a change is unnecessary. If one motor is in small cubic capacity mode, it is necessary to check whether it is possible to change its cubic capacity. As indicated above, a motor going over suddenly from its small cubic capacity to its large cubic capacity generates a sudden operating jolt.

During progressive hydrostatic braking, the cubic capacity of the motor is increased only once the cubic capacity of the pump feeding the motor has been decreased sufficiently so that, as soon as the cubic capacity of the motor has been increased, it can be increased so as momentarily to deliver a fluid flow rate that is sufficient to rotate the motor whose cubic capacity has just increased suddenly at a speed in the vicinity of the speed at which the motor was rotating immediately before its cubic capacity was increased. In outline, if the large cubic capacity is equal to twice the small cubic capacity, going over from the small to the large cubic capacity is possible only if the cubic capacity of the pump is no larger than one half of the maximum cubic capacity of the pump, thereby making it possible momentarily to double the cubic capacity of the pump in order to compensate for the sudden increase in the cubic capacity of the motor.

When the parameters supplied to the ECU indicate that it is possible to change the cubic capacities of the motors, said ECU checks whether or not the situation is an emergency braking situation. If it is, then as indicated above, it is advantageous for the ECU to generate an order canceling the delays in cubic capacity change for the axle mainly affected by the braking (the front axle in this example), and, simultaneously, to prevent cubic capacity change for the motors of the rear axle. The order to cancel the delays corresponds to canceling the above-described step of softening the deceleration.

Preferably, the change in motor cubic capacity concerns only the motor(s) that drive(s) the front axle of the vehicle. It is necessary to brake preferentially the wheels on said front axle, which is the axle primarily affected by the braking. Conversely, it is desirable to prevent, at least momentarily, the cubic capacity of the motors of the rear axle from being increased. This makes it possible to limit the braking force on the rear wheels because, during sudden braking, a large portion of the load on them is transferred to the front axle, and thus to prevent the rear wheels from blocking. If the rear wheels are not equipped with friction brakes, this also makes it possible to prevent the rear wheels from turning backwards.

Once this order has been issued, the ECU manages the change in speed of the motor(s) in question by increasing their cubic capacities and by increasing momentarily the cubic capacity(ies) of the pump(s) serving to feed them. This change in speed is managed conventionally so that the increase in the cubic capacity of the pump makes it possible for the motor, when it is in its large cubic capacity, to have a speed substantially equal to or slightly lower than the speed it had when in its small cubic capacity, while remaining within a maximum deceleration range accepted in this stage of the braking, e.g. about 5 m/s$^2$.

It is considered, for example, that the motors of the front axle are in small cubic capacity mode and that their large cubic capacity is equal to twice their small capacity. In which case, the cubic capacity of the pump as calculated during the speed change management step can be equal to twice the cubic capacity calculated before the decision to change the cubic capacities of the motors. It is on the basis of the cubic capacity calculated in managing the speed change that the new order is established that is to be sent to the pump for setting its cubic capacity at the next time step.

If changing the cubic capacities of the motors is impossible or inopportune, the cubic capacity calculated before checking the opportuneness of changing the cubic capacities serves to establish the new order.

Advantageously, the ECU causes a motor to go over to its large active cubic capacity after the fluid flow rate delivered by the pump decreases suddenly. In practice, and with reference to FIG. 3, the ECU determines, for example, a large jump in pump cubic capacity, serving to calculate the next pump cubic capacity. The control unit can be programmed so that the test for checking the opportuneness of changing the cubic capacities of the motors is systematically negative at the first time step of an emergency braking procedure.

Advantageously, the braking system includes means for determining the fluid pressure in a feed duct of the hydraulic motor that is at the high pressure during braking, and said fluid pressure is taken into account in determining the order used by the braking management means for controlling the hydrostatic braking.

Thus, FIG. 1 shows that a pressure sensor 82 detects the pressure in the main duct 56 and thus in the ducts 11, 21, 31, and 41 of the motors.

The information of the detected pressure is transmitted to the ECU by a line L82. The duct 56 is the duct which, when the vehicle is traveling forwards, is connected to that one of the feed ducts of each motor which is at the high pressure during hydrostatic braking. In general, said feed duct is the duct that serves as the fluid return when the vehicle is traveling forwards.

Taking account of said pressure makes it possible, for example, to determine a maximum hydrostatic braking torque by causing the cubic capacity of the pump to vary so that the pressure in said feed duct at high pressure remains at its maximum. However, it can be desired to obtain a constant braking torque, which makes it necessary to take account of the pressure variation in said duct. Given the pressure in said duct, it is also possible to seek to obtain a predetermined distribution between the hydrostatic braking torque and the friction braking torque. For example, it is possible to make the two torques equal, and thus to make each of them contribute to one half of the braking.

Figure 4:
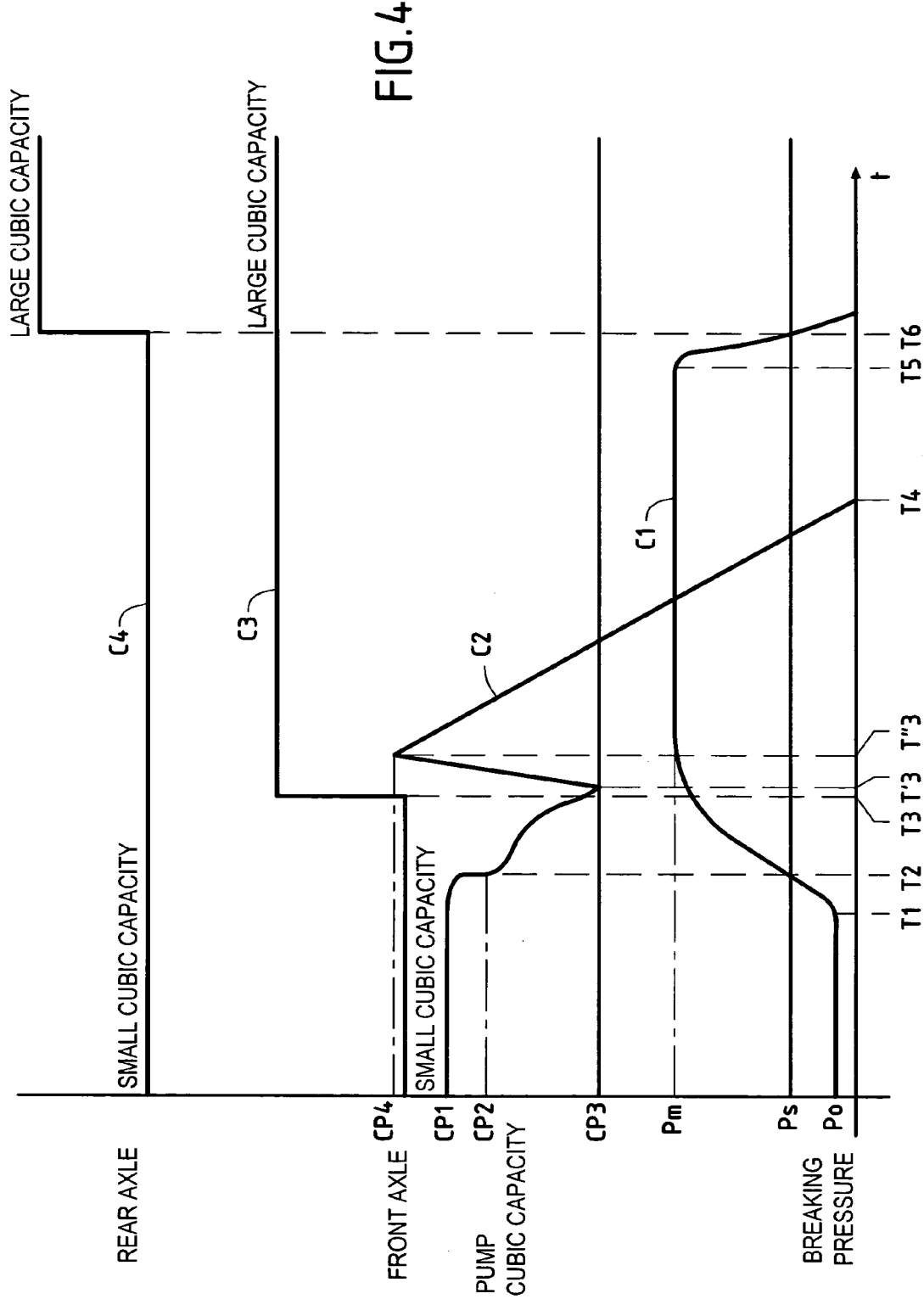
FIG. 4 shows the curves showing how the braking pressure and the cubic capacity of the pump vary over time during a braking situation, this figure also showing, for a vehicle whose front and rear axles are driven by motors each having two cubic capacities, how the cubic capacities of the motors vary over time.

FIG. 4 makes it possible to understand how emergency braking is implemented. The curves C1, C2, C3, and C4 respectively show how the following vary over time: braking pressure, cubic capacity of the pump, cubic capacity of the motor(s) of the front axle, and cubic capacity of the motor(s) of the rear axle.

This graph has no units because its purpose is mainly to compare the variations over time (plotted along the x-axis) of the braking pressure and of the cubic capacities (plotted up the y-axis).

It is considered that the brake system applies to a vehicle whose two axles are driven by different motors, it being possible for the vehicle to have a single motor per axle or else one motor per wheel. That is why, in general, reference is made to the cubic capacity of the rear axle and to the cubic capacity of the front axle, these cubic capacities corresponding to the motor(s) of the axles.

When the vehicle is operating normally, no braking is caused, and the braking pressure remains at its standby threshold value Po. At time T1, the driver depresses the brake pedal in order to cause braking to take place. The braking pressure increases suddenly and, as soon as it exceeds a value Ps corresponding to the emergency braking threshold, an emergency braking situation is detected. Thus, the emergency braking situation is detected at time T2.

Whereupon, the ECU causes the cubic capacity of the pump to decrease suddenly. Thus, in a very short lapse of time, said cubic capacity of the pump goes to a suddenly decreased value CP2. Since the vehicle was initially traveling at a constant speed over flat terrain, the cubic capacity of the pump was equal to CP1. When braking was caused, at time T1, the situation was initially a normal braking situation, and the ECU was able, between times T1 and T2, to cause progressive hydrostatic braking to place, by decreasing slightly the cubic capacity of the pump as shown in FIG. 4. It is only once the emergency braking situation has been detected at time T2 that the cubic capacity of the pump decreases suddenly to go to its value CP2. As from this situation, the cubic capacity of the pump decreases steadily so that the deceleration of the vehicle corresponds to the maximum desired deceleration. In FIG. 4, this decrease has an almost constant slope.

In the example shown in FIG. 4, it is considered that the motors of the front and rear axles were initially in their small active operating cubic capacities. Once the cubic capacity of the pump has decreased sufficiently to reach a value CP2 corresponding to the threshold enabling the motors of the front axle to go over to their large cubic capacity mode, which threshold is defined as indicated above, the motor(s) of the front axle are caused to go over to their large cubic capacities at time T3. As indicated above, the delay in changing the cubic capacities of the motors of the front axle is canceled in an emergency braking situation. As a result, said motor goes over to its large cubic capacity very slightly before the cubic capacity of the pump starts to increase, at time T'3. This is increase is slower than the increase in the cubic capacities of the motors, and the cubic capacity CP4 desired for the pump is reached at time T"3. As a result, a jolt occurs in braking of the vehicle, but that jolt is acceptable in an emergency braking situation. Between the times T'3 and T"3, the cubic capacity of the pump is thus increased to reach a value CP4 making it possible for the motor(s) of the front axle, which motor(s) is/are now in their large cubic capacity(ies), to have a speed equal to or slightly less than the speed they had before the cubic capacity of the pump was changed. As from said value CP4, the decrease in the cubic capacity of the pump resumes steadily until it reaches zero at time T4, whereupon the vehicle stops.

It should be noted that, for the reasons indicated above, only the cubic capacity of the motor(s) of the front axle has been increased, the cubic capacity of the motor(s) of the rear axle having remained fixed at the small cubic capacity. Since it is an emergency braking situation, the braking pressure rapidly reaches its maximum value Pm, making it possible for the friction brake means to be operated to their maximum extent. The vehicle stops at time T4 and the driver releases the brake pedal at time T5, whereupon the braking pressure decreases rapidly. When said pressure becomes sufficiently low, at time T6, the motor(s) of the rear axle can in turn go over to their large cubic capacity, so that the motor is in its large cubic capacity so that it can deliver maximum torque the next time the vehicle starts again.

Although the figures described relate to a vehicle in which both of its axles are motor-driven, with, in addition, motors having a plurality of active cubic capacities, it should be understood that the invention also applies to vehicle brake systems in which only one axle is motor-driven, optionally with motors each having a single cubic capacity.

The invention is particularly though not exclusively applicable to hydrostatic transmissions using slow high-torque motors, of the radial-piston type, or of the internal gear (gerotor) type, having one or more cubic capacities, for driving the front wheels and/or the rear wheels of a vehicle.

What is claimed is:

1. A method of operating a brake system for a hydraulic motor, the method comprising:
feeding the hydraulic motor with at least one pump having a variable cubic capacity, in a closed circuit;
providing a friction brake to brake the motor;
providing a brake controller that controls an amount of applied frictional braking by the friction brake and an amount of applied hydraulic braking;
determining a level of actuation of the brake controller to detect normal and emergency braking situations;
in normal braking situations, managing the proportional amount of frictional and hydraulic braking as a function of at least one input parameter, to cause progressive hydrostatic braking to occur by causing a ratio between a fluid flow rate delivered by the pump and an active cubic capacity of the motor to decrease progressively;
in emergency braking situations, causing a controlled sudden decrease to take place in the ratio between the fluid flow rate delivered by the pump and the active cubic capacity of the motor, and then causing progressive hydrostatic braking to occur; and
activating the friction brake during both of said normal and emergency braking situations.

2. The method according to claim 1, wherein, in emergency braking situations, the controlled sudden decrease in the ratio between the fluid flow rate delivered by the pump and the active capacity of the motor is caused by a sudden decrease in the fluid flow rate delivered by pump.

3. The method according to claim 2, wherein the sudden decrease in the fluid flow rate delivered by the pump is caused by a sudden decrease in the cubic capacity of the pump.

4. The method according to claim 3, further comprising:
determining an amount of the sudden decrease in the cubic capacity of the pump as a predetermined proportion of the active cubic capacity of the pump at the time of braking.

5. The method according to claim 2, wherein the at least one input parameter is selected from the group consisting of:

the level of actuation of the brake controller, a speed of a vehicle powered by the motor, an active cubic capacity of the pump, and the active cubic capacity of the motor.

6. The method according to claim 1, further comprising:
providing the hydraulic motor with a plurality of active operating cubic capacities;
when braking is caused to take place while the motor is in a small active cubic capacity, managing the proportional amount of frictional and hydraulic braking to cause the motor to go over to a larger active cubic capacity when the value of the active cubic capacity of the pump is less than or equal to a limit value; and
increasing a value of said active cubic capacity of the pump to a value determined as a function of the motor going over to said larger active cubic capacity preventing said motor from generating a sudden decrease in the speed of the motor, and for progressively decreasing the cubic capacity of the pump from said determined value.

7. The method according to claim 6, further comprising:
in normal braking situations, managing the proportional amount of frictional and hydraulic braking to maintain the cubic capacity of the pump at a given value corresponding to the motor being allowed to go over to its large active cubic capacity, for a stabilization lapse of time, before causing the motor to go over to the larger active cubic capacity; and
in an emergency braking situations, decreasing or substantially canceling the stabilization lapse of time.

8. The method according to claim 7, further comprising, in emergency braking situations, causing said motor to go over said larger active cubic capacity, after suddenly decreasing the fluid flow rate delivered by the pump.

9. The method according to claim 6, further comprising, in emergency braking situations, causing a sudden decrease to occur in the ratio between the fluid flow rate delivered by the pump and the active capacity of the motor to cause said motor to go over to said larger active cubic capacity, after the sudden decrease in the fluid flow rate delivered by the pump.

10. The method according to claim 6, further comprising:
providing a vehicle having a plurality of displacement members, disposed in succession in the direction in which the vehicle travels, and each displacement member being driven by at least one hydraulic motor;
managing the proportional amount of frictional and hydraulic braking of the at least one hydraulic motor for a single displacement member to go over to a maximum active cubic capacity prior to or at the time of braking, without modifying the active cubic capacity of the at least one hydraulic motor that drives the other displacement members.

11. The method according to claim 1, wherein, in emergency braking situations, the controlled sudden decrease in the ratio between the fluid flow rate delivered by the pump and the active capacity of the motor is managed as a function of said at least one input parameter.

12. The method according to claim 11, wherein the at least one input parameter is selected from the group consisting of: the level of actuation of the brake controller, a speed of a vehicle powered by the motor, an active cubic capacity of the pump, and the active cubic capacity of the motor.

13. The method according to claim 1, wherein the at least one input parameter is selected from the group consisting of: the level of actuation of the brake controller, a speed of a vehicle powered by the motor, an active cubic capacity of the pump, and the active cubic capacity of the motor.

14. The method according to claim 1 further comprising:
providing an auxiliary engine to drive the pump; and
managing the proportional amount of frictional and hydraulic braking to cause a drive speed of said engine to be reduced at least at a beginning of a braking stage.

15. The method according to claim 1, further comprising:
providing an actuatable control member;
providing at least two brake members constrained to rotate respectively with a rotor and with a stator of the motor;
providing an actuator with a moving portion which co-operates with one of said two brake members to urge the at least two brake members into friction contact with each other as a function of fluid pressure in the actuator; and
determining a level of actuation of the brake controller to detect the amplitude of actuation of said control member or the fluid pressure in the actuator.

16. The method according to claim 1, further comprising:
monitoring fluid pressure in a feed duct of the hydraulic motor that is at high pressure during the braking stage;
and using the monitored fluid pressure as at least one of said at least one input member.

* * * * *